US008147689B1

(12) United States Patent
Cogar

(10) Patent No.: US 8,147,689 B1
(45) Date of Patent: Apr. 3, 2012

(54) MATERIALS DEWATERING UNIT

(76) Inventor: Lowell Cogar, Beckley, WV (US)

( * ) Notice: Subject to any disclaimer, the term of this patent is extended or adjusted under 35 U.S.C. 154(b) by 385 days.

(21) Appl. No.: 12/460,018

(22) Filed: Jul. 10, 2009

Related U.S. Application Data

(60) Provisional application No. 61/134,643, filed on Jul. 11, 2008.

(51) Int. Cl.
B01D 29/01 (2006.01)
B01D 29/64 (2006.01)
B01D 29/88 (2006.01)
B01D 35/34 (2006.01)

(52) U.S. Cl. ........ 210/173; 210/241; 210/413; 210/498; 210/499; 209/273; 241/68; 241/79

(58) Field of Classification Search .......... None
See application file for complete search history.

(56) References Cited

U.S. PATENT DOCUMENTS

| 955,843 | A | * | 4/1910 | Bossert | 210/355 |
|---|---|---|---|---|---|
| 1,872,301 | A | * | 8/1932 | Klugh | 209/351 |
| 1,920,158 | A | * | 7/1933 | Albertson | 210/159 |
| 2,127,987 | A | * | 8/1938 | Slater | 209/155 |
| 2,178,456 | A | * | 10/1939 | Pool | 209/17 |
| 2,436,795 | A | * | 3/1948 | Dennis | 209/357 |
| 2,593,353 | A | * | 4/1952 | Shelton, Jr. | 241/80 |
| 2,835,388 | A | * | 5/1958 | McLean | 209/474 |
| 2,845,180 | A | * | 7/1958 | McAfee | 210/413 |
| 2,861,688 | A | * | 11/1958 | Harms | 210/744 |
| 2,865,509 | A | * | 12/1958 | Harlan | 210/312 |
| 2,919,806 | A | * | 1/1960 | Hock et al. | 210/414 |
| 3,102,857 | A | * | 9/1963 | Dauenhauer | 209/308 |
| 3,420,658 | A | * | 1/1969 | Berhenke et al. | 75/409 |
| 3,570,674 | A | * | 3/1971 | Dahlem | 210/400 |
| 3,795,316 | A | * | 3/1974 | Wood | 210/298 |
| 3,926,302 | A | * | 12/1975 | Smith | 198/741 |
| 4,243,527 | A | * | 1/1981 | Leonard | 210/785 |
| 4,639,258 | A | * | 1/1987 | Schellstede et al. | 95/260 |
| 4,731,180 | A | * | 3/1988 | Huff | 210/298 |
| 4,948,299 | A | * | 8/1990 | Cronk et al. | 405/179 |
| 5,156,749 | A | * | 10/1992 | Williams | 210/770 |
| 5,268,100 | A | * | 12/1993 | Hartzell | 210/396 |
| 5,339,961 | A | * | 8/1994 | Mayhak | 209/3 |
| 5,421,147 | A | * | 6/1995 | Holden et al. | 56/328.1 |
| 5,451,315 | A | * | 9/1995 | Miller | 210/170.01 |
| 5,565,112 | A | * | 10/1996 | Bratten | 210/780 |
| 5,569,382 | A | * | 10/1996 | Reynders | 210/391 |
| 5,571,404 | A | * | 11/1996 | Derenthal | 210/97 |
| 5,601,729 | A | * | 2/1997 | Bratten | 210/783 |
| 5,603,846 | A | * | 2/1997 | Uchiyama et al. | 210/784 |
| 5,624,579 | A | * | 4/1997 | Bratten | 210/783 |
| 5,643,468 | A | * | 7/1997 | Ure | 210/771 |

(Continued)

Primary Examiner — Robert James Popovics

(57) ABSTRACT

A dewatering conveyor system for dewatering chunks of petroleum coke or the like material which is mixed with large volumes of water, wherein the conveyor employs lateral drag bars, the top flight of which conveyor slides forwardly on a screening deck having dewatering screens, and the bottom flight of which conveyor slides rearwardly on a sluice deck underlying the screening deck, wherein a major portion of the conveyor rearward of its discharge end is contained by tail end wall means and side and bottom wall means which can contain large volumes of coke and water, wherein, for handling large volumes of water the discharge end of the conveyor is elevated, e.g., up to 20 ft. or more above the tail end of the conveyor such that water dropping thru the screens will run down toward the tail end of the conveyor and leave the discharge end above the water line, and wherein a drain port is located thru the bottom wall means at a tail end portion thereof.

11 Claims, 10 Drawing Sheets

Flight Bars drag material and water across screen, water passes through and is moved by gravity or return of flight bars. Thus discharging material in one direction and water in the other.

U.S. PATENT DOCUMENTS

| | | | |
|---|---|---|---|
| 5,779,887 A * | 7/1998 | Rector et al. | 210/159 |
| 5,832,873 A * | 11/1998 | Tu | 119/479 |
| 5,858,218 A * | 1/1999 | Setlock et al. | 210/167.01 |
| 5,961,847 A * | 10/1999 | Creps et al. | 210/783 |
| 5,968,353 A * | 10/1999 | Herbert et al. | 210/221.2 |
| 6,026,765 A * | 2/2000 | Tu | 119/479 |
| 6,494,167 B1 * | 12/2002 | Chen | 119/479 |
| 6,540,911 B1 * | 4/2003 | Bajema | 210/154 |
| 6,899,807 B2 * | 5/2005 | Cummings | 210/97 |
| 7,122,119 B2 * | 10/2006 | Gribble et al. | 210/232 |
| 7,824,547 B2 * | 11/2010 | Reynders et al. | 210/171 |
| 7,913,854 B2 * | 3/2011 | Bratten et al. | 210/400 |
| 8,029,670 B2 * | 10/2011 | Dietenhauser et al. | 210/236 |
| 2003/0127375 A1 * | 7/2003 | Gribble et al. | 210/101 |
| 2003/0230520 A1 * | 12/2003 | Cummings | 210/85 |
| 2007/0051672 A1 * | 3/2007 | Reynders et al. | 210/167.09 |
| 2007/0210013 A1 * | 9/2007 | Bratten et al. | 210/783 |
| 2011/0005985 A1 * | 1/2011 | Dietenhauser et al. | 210/171 |

* cited by examiner

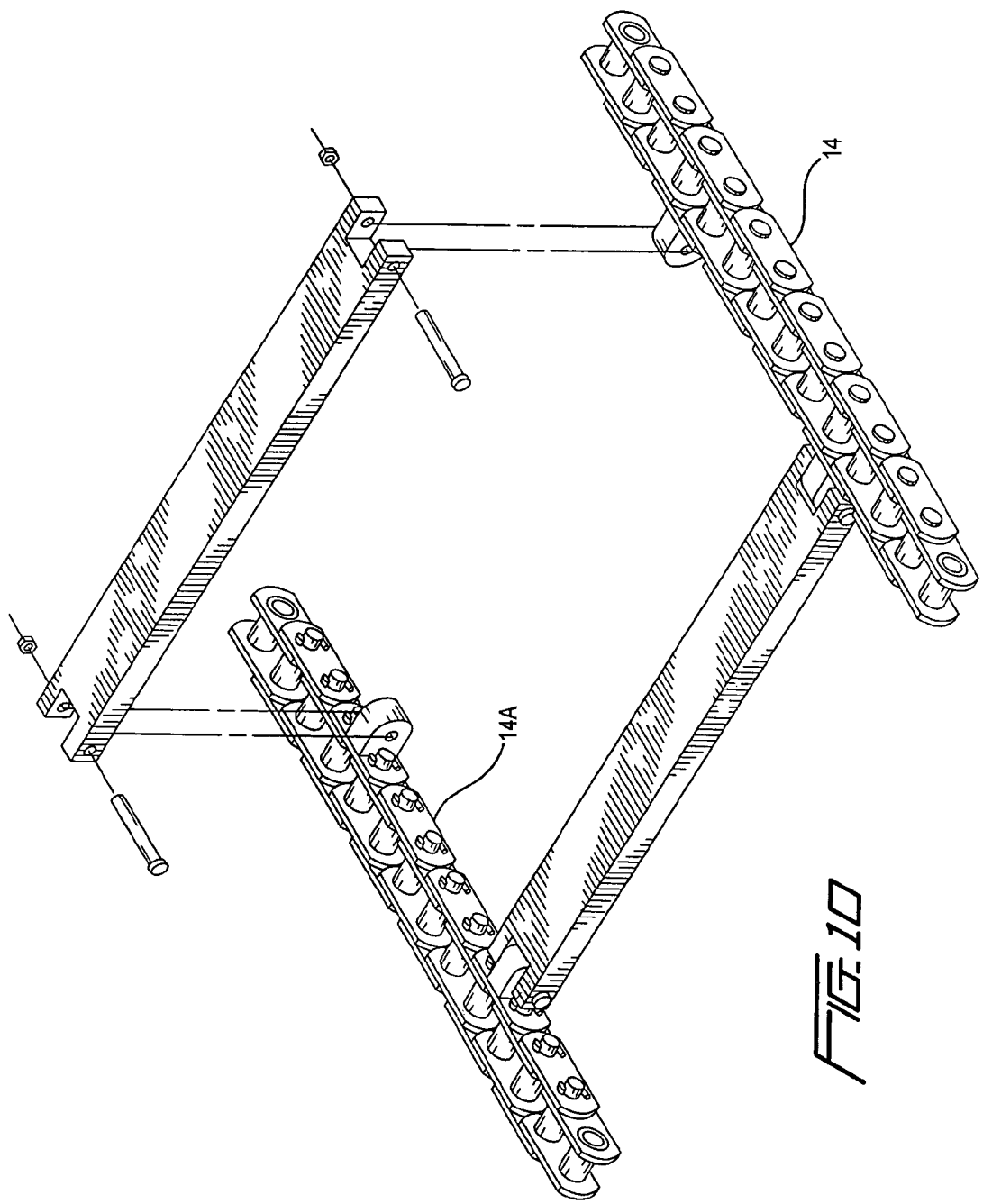

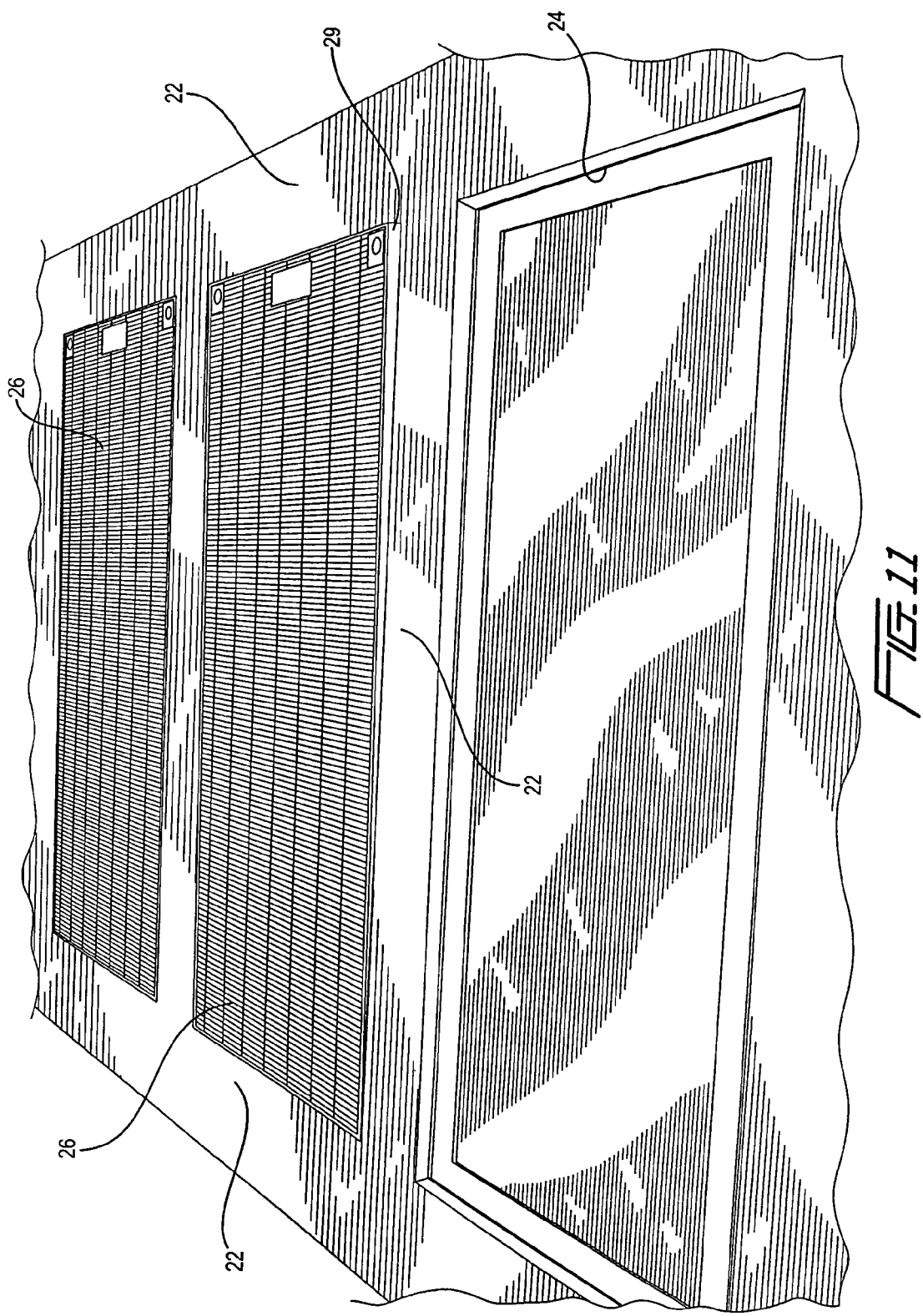

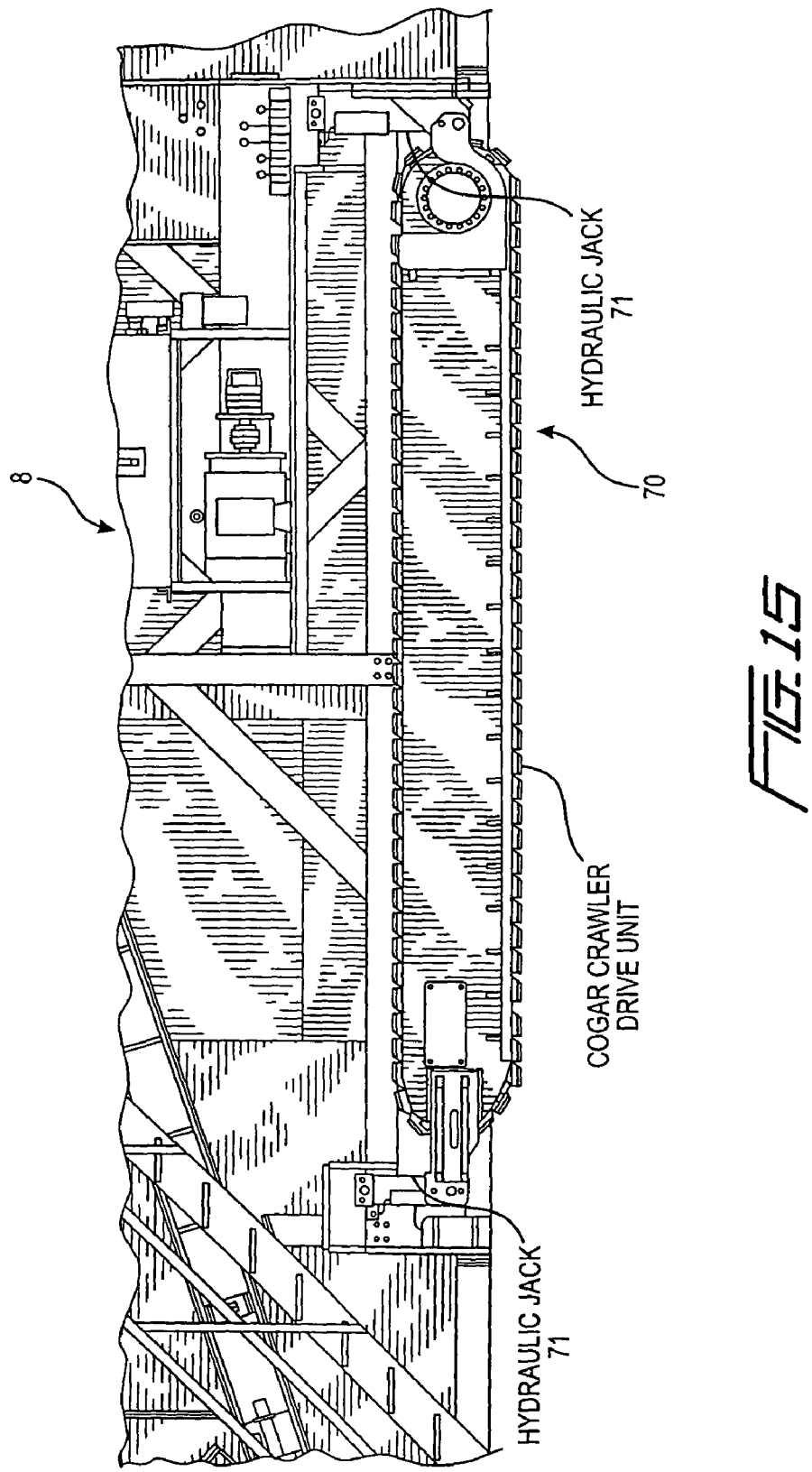

MATERIALS DEWATERING UNIT

This application claims priority under 35 U.S.C. 119(e)(1) based on Applicant Provisional U.S. Patent Application Ser. No. 61/134,643 filed Jul. 11, 2008 and titled "MATERIALS PROCESSING CONVEYOR UNIT".

BACKGROUND OF THE INVENTION

1. Field

This invention is directed to a materials dewatering and crusher unit which is particularly constructed for receiving and processing large quantities of oil refinery residues, particularly from the delayed coking process as coke feed chunks, or coal feed chunks or the like, including fines, which have been mixed with large volumes of water, whereby by the way of the present apparatus and method of operation the water is rapidly removed from the material chunks and the chunks are readily reduced to desired sizes such that the consequent substantially dried product can be conveyed readily to further processing equipment or stations by conventional conveyor systems.

As background information, the pet coke is manufactured in tall towers, approximately 30' diameter and 100' tall. To remove material from the towers (ovens) a hole is bored down thru in the center of the hardened coke in each tower of 18-24" in diameter, and then a high pressure water spray blasts the broken pieces of coke from the ovens (900-1200 gpm of water at 3500 psi). Water and "Pet Coke" comes out of the tower bottom and is captured by the present unit. Our drag chain conveyor moves material and water over a deck and screens where the material is dewatered and then crushed. Additional screens are positioned preferably down stream of the crusher for additional dewatering. We run approximately 500 tons per hour of coke. The pet coke is around 55 pounds per cubic foot and crushes easily. It normally is high BTU (12000 BTU plus) and high sulfur (4 to 6 percent). Normal painted surfaces rust quickly so we are using stainless steel decks and screens and employ a galvanized frame.

Typically where delayed coking units are employed, the coke from the coking towers or drums which can hold typically 200-400 metric tons of coke can extend vertically for sixty fee or more. The coke is blasted out of the towers by high pressure water jets outletting from a hollow shaft extending down thru a large hole cut down thru the center of the solidified coke.

This pressure blasting comprises drilling a hole down thru the coke by means of a cutting device on the shaft while jetting high pressure water against the coke. This process typically takes several hours and results in many tons of cracked up coke and water being mixed in the tower. The water/coke mixture is then discharged through a bottom port of the tower to dewatering or other systems such as crushing, classifying or conveying apparatus

2. Prior Art

In such coke discharge operations, a large amount of contaminated wastewater results and must be contended with out flooding of the coking site. Many types of dewatering systems have and are being used such as shown in U.S. Patents or applications; US2003/0217960A1; U.S. Pat. Nos. 5,460,699; 7,108,793 B2; 4,420,404; 2,474,251; 3,257,309; 5,355,696; and 4,986,910. None of the above prior apparatus or methods afford the simplicity and effectiveness of the present invention which is summarized below.

SUMMARY OF THE INVENTION

A dewatering unit for separating chunks of petroleum (PET) coke from the large quantity of water used to unload coking towers, wherein the unit employs a conveyor having a series of drag bars extending laterally across the conveyor and longitudinally spaced apart and connected at their ends to tandem continuous chains, the top flight of the chains and the drag bars ride on top of a screening deck and the bottom flight of the chains and bars ride on top of a sluice deck, wherein water drain screens are provided in the screening deck, the forward portion (dewatered material discharge end) of the screen deck or the conveyor itself preferably is angled upwardly toward the discharge end of the conveyor, both decks are contained within wall means which provides a water containment means, and wherein water discharge port means is provided in a tail end portion of the wall means.

The invention will be further understood from the drawings herein and their description below, wherein the various structures are not drawn to scale or consistent proportions, and wherein;

FIG. 8 is a perspective view of a preferred dewatering screen used in the present unit and giving exemplary dimensions;

FIG. 9 is a cross-sectional view taken along line 9-9 in FIG. 8 showing a portion of the screen grillwork (profile wires) and giving exemplary dimensions;

FIG. 10 is a perspective exploded view of a preferred chain structure;

FIG. 11 is a perspective view of a drain screen installation procedure in progress;

FIG. 15 is a side view of the conveyor unit mounted on a positioning crawler.

DETAILED DESCRIPTION

Figure 1:
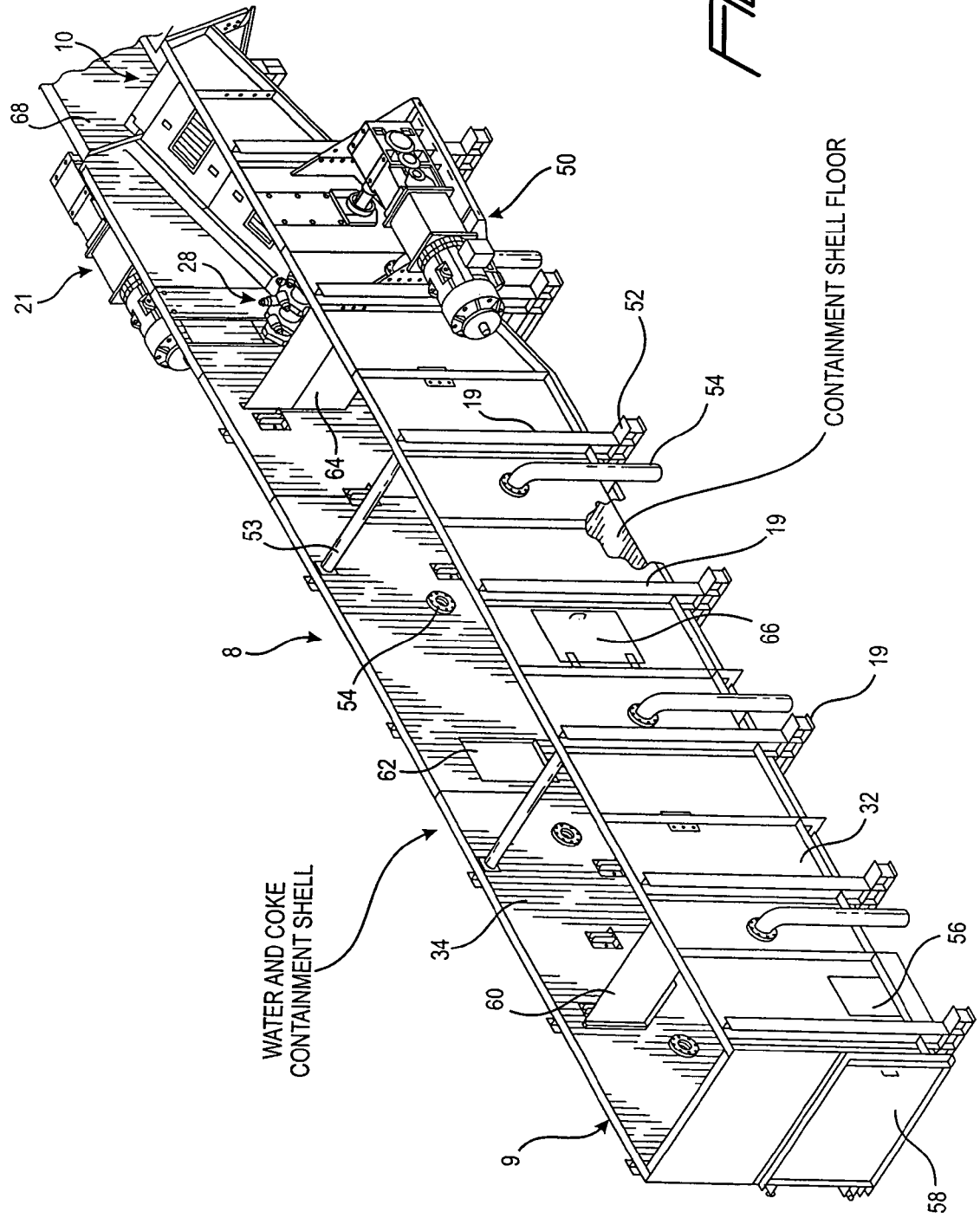
FIG. 1 is a top down perspective view of the present dewatering unit with chain sprockets not shown and with the direction of travel of the feed materials (coke/water) from left to right.

Conventional conveyors pull feed chunk coke material beneath a single roll crusher which normally crushes the material to 6" by 0 size so that it can be handled on conventional belts without damage to the belt. The present invention is designed mainly for a special use at an oil refinery that produces petroleum coke. At the end of the refinery process, there is an oily material left which is pumped into coking towers. It is then baked for about 12 hours in towers to remove the liquids. The material solidifies into "pet coke" which looks and handles a lot like coal.

The present unit receives a discharge from the coking towers of about 500 tons/hour of chunks of coke material and water. The coke is about 55 pounds per cubic foot and crushes easily. The present unit receives, dewaters, crushes, and conveys that material. The water is then discharged in a controlled environmentally safe manner into holding tanks below the machine or into ponds where it is recycled and used for the blasting of coke from the next tower.

Dragging the material and water by drag bars (flights) over screen areas as shown in the drawings does the dewatering. Water and fines pass through the screens by gravity and are moved by the bottom flight in the opposite direction to the dewatered material carried on by the top flight. The openings of the screens can be varied to collect small particulates and coke fines and the drying effectively allows the material to be transported to further processing sites on a normal belt system. The dewatering occurs in spaced sections of the conveyor deck and is more effective by widening the conveyor, by slowing the conveyor chain and by thinning the amount of material so water passes through more easily. The bars dragging across the screens has proven to be very effective and is different from other screen processes wherein the screen is the moving mechanism. In a most preferred embodiment, additional screens are provided downstream of the crusher device whereby more efficient dewatering results from the more porous bed of crushed coke.

Referring to the drawings die present invention, in certain preferred embodiments, comprises a materials conveyor and crusher unit generally designated 8 having a materials receiving or tail end 9 and a materials discharge or head end 10 for receiving, dewatering, crushing and conveying chunks of coke, coal, or the like feed material 11. This structure has an elongated longitudinal dimension 12 and a substantially uniform lateral dimension 13. The unit has laterally spaced continuous chains 14, 14A mounted around a drive sprocket 15 and an idle sprocket 17 mounted on frame means 19 and providing top 16 and bottom 18 chain flights. A drive means 21 for rotating sprocket 15 for cycling (running) said chains in tandem is mounted on said frame. A plurality of longitudinally spaced (e.g., 1-3 ft.) material drag (flight) bars 20 span and are connected at their ends 23 to said chains as shown in FIG. 10. Stationary screening deck means 22 mounted on said frame means has a substantially upper lateral planar 25 surface and slidingly supports said top chain flight 16 along said lateral dimension and is constructed with rectangular recessed edges 24 to support frames 29 of drain screens 26. A crushing or breaker means 28 is provided on said unit for receiving chunk material and crushing it to desired sizes. A stationary sluice deck means 30 for receiving and containing water and material fines is mounted on the frame means underneath the bottom chain flight and supports the bottom flight of the drag bars whereby the water and fines can be dragged in the opposite direction to the top chain flight and to the dewatered material thereon and on to a water/fines discharge outlet in the bottom of the unit.

Figure 3:
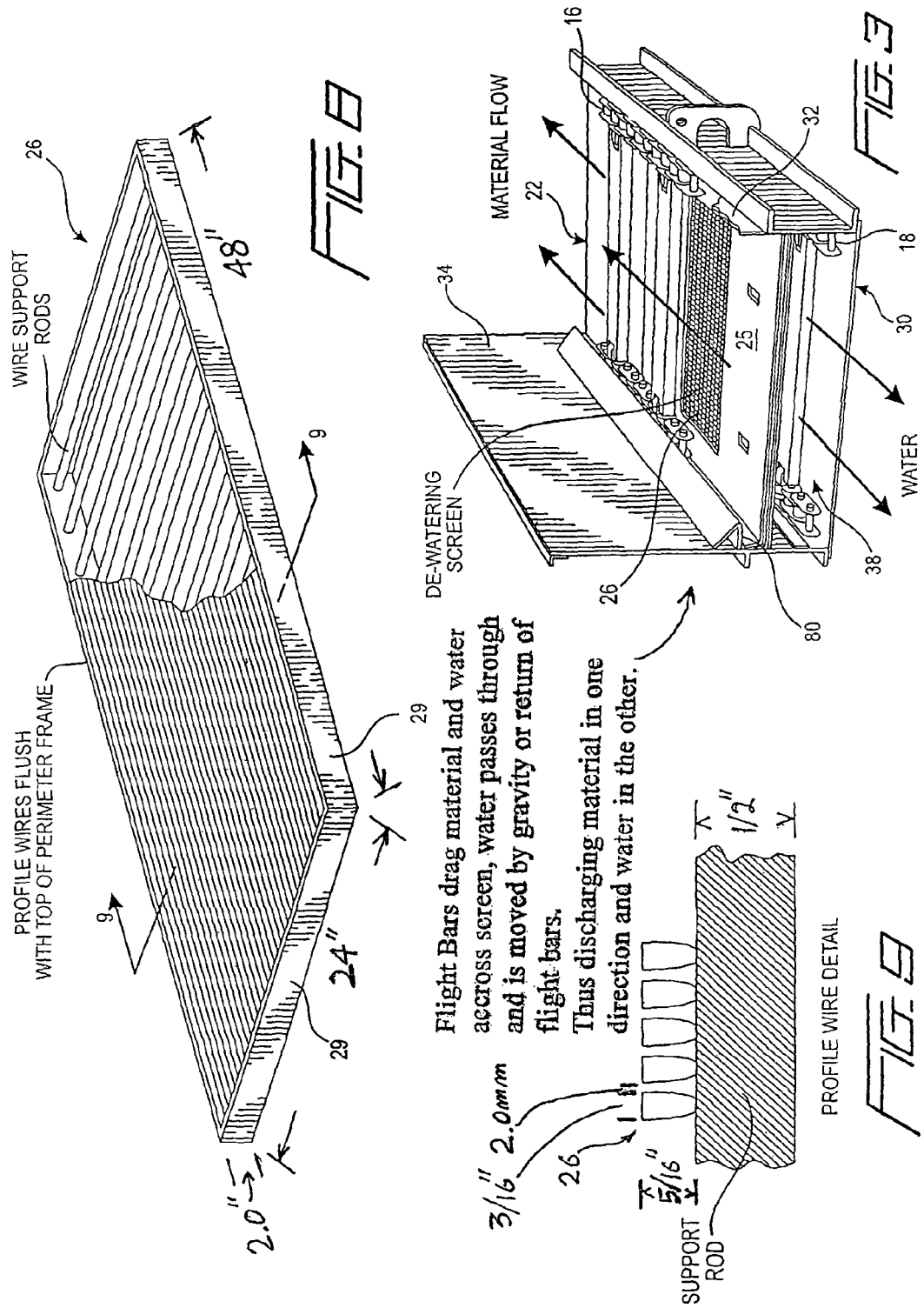
FIG. 3 is a portion of the unit of FIG. 1 showing the feed materials (chunks/water) flow pattern on the top flight and the water/fines sluice flow pattern on the bottom flight.
Figure 4:
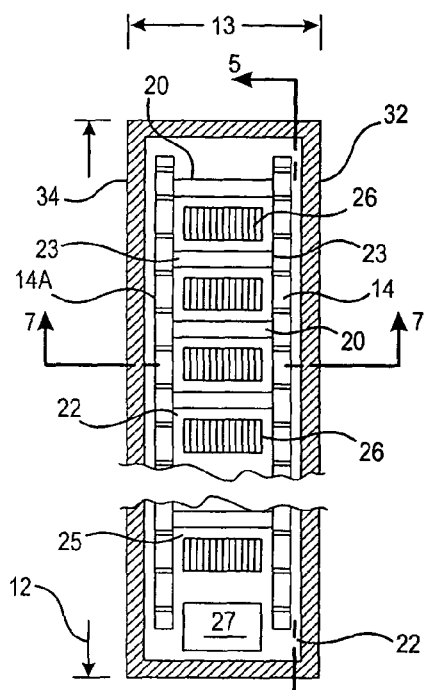
FIG. 4 is a longitudinal top down schematic view of the present unit showing the principal structures in explanatory simplified form.
Figure 5:
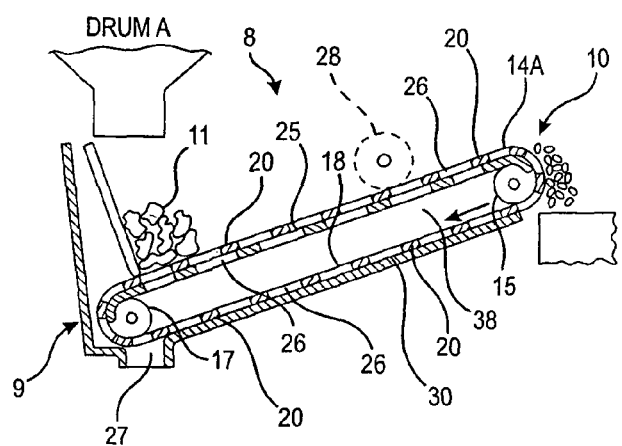
FIG. 5 is a longitudinal cross-sectional view taken along line 5-5 in FIG. 4 and showing a fully inclined version of the present unit.
Figure 6:
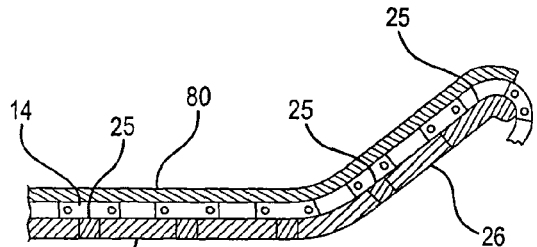
FIG. 6 is a view as in FIG. 5 and showing an inclined discharge end version of the present unit.
Figure 7:
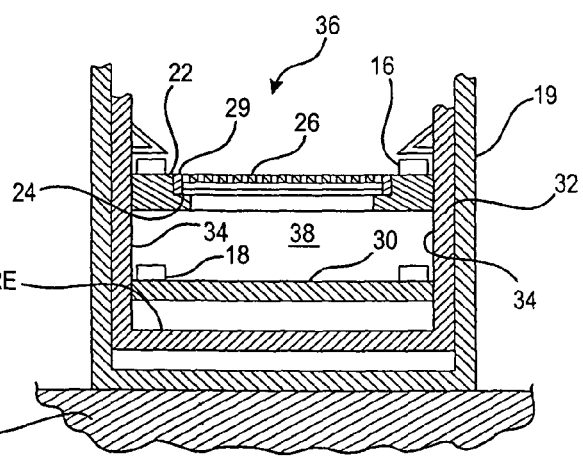
FIG. 7 is a cross-sectional view taken along line 7-7 in FIG. 4.
Figure 12:
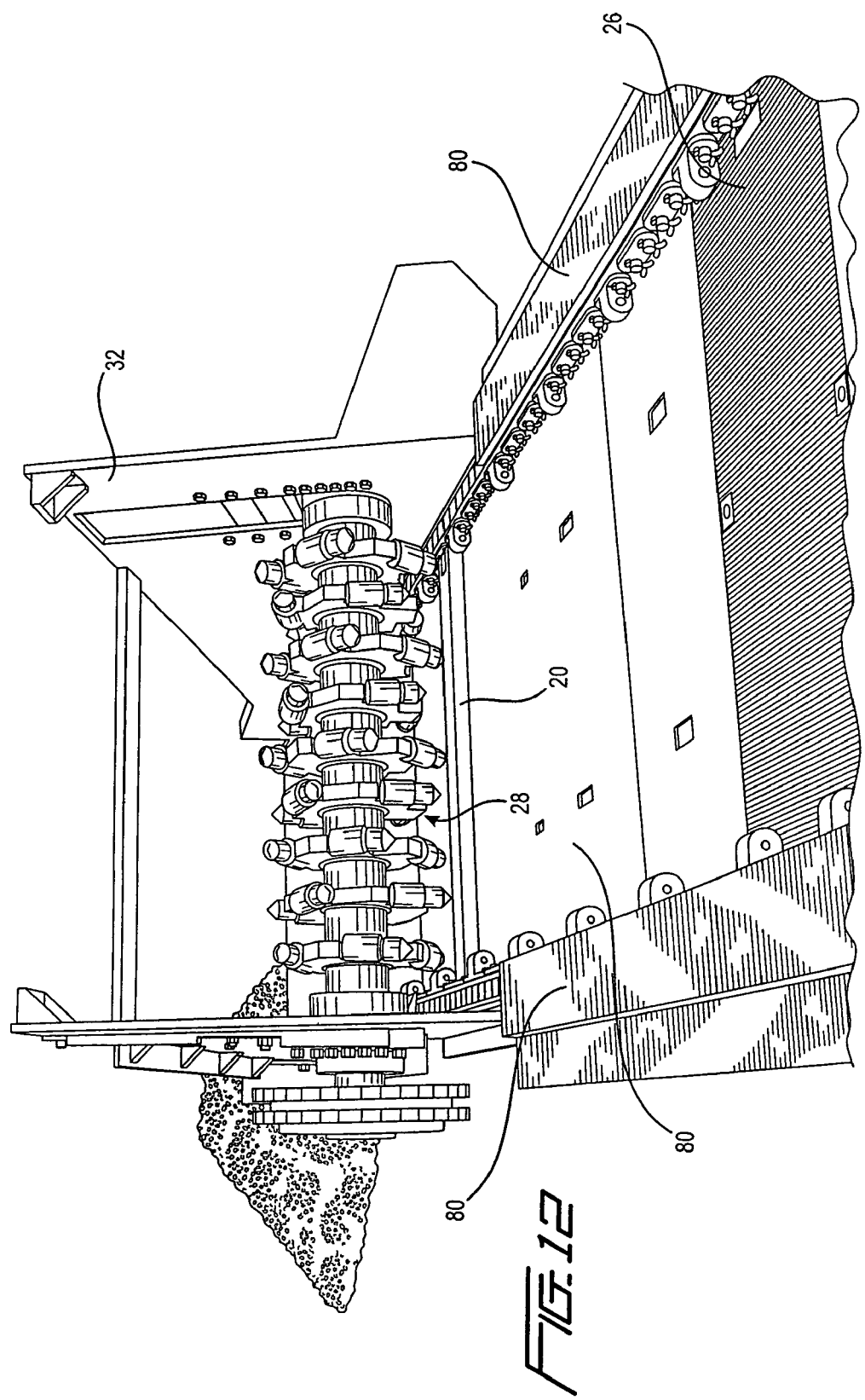
FIG. 12 is a perspective view of a discharge end portion of the screening deck which lies adjacent to an upstream crusher (chunk breaker)

As seen from FIGS. 3 and 7, the screening deck 22 and sluice deck 30 are conveniently affixed at their side edges to side walls 32 and 34 of the conveyor structure such as to provide a water containment section 36 above the screening deck and to form a water containment sluice cavity 38 between the decks. Walls 32 and 34 have a substantial height, e.g., 8-15 ft. in order to accommodate and contain the large volumes of water and coke dumped into the conveyor unit from the coking towers.

Figure 2:
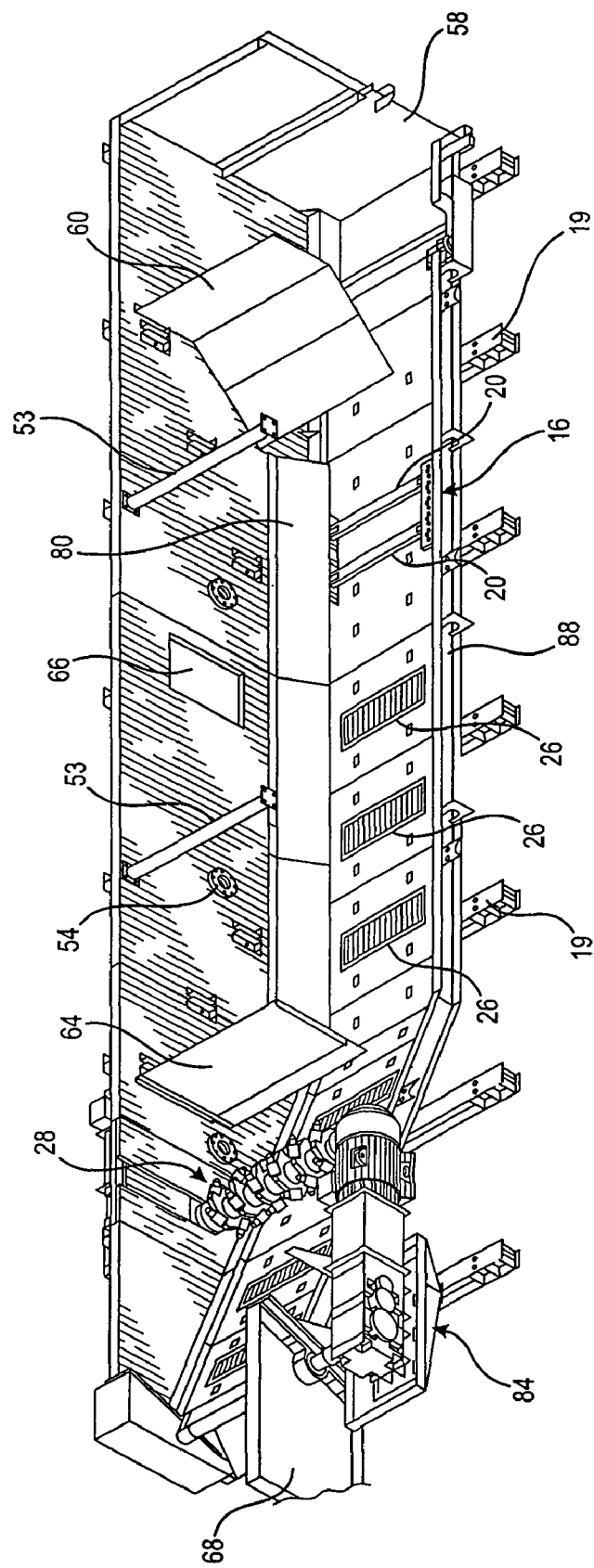
FIG. 2 is a right to left perspective view of the unit of FIG. 1 with the near side wall removed for clarity.

Further to the drawings, and in particular to FIGS. 1 and 2, the present unit is constructed with crushing (breaker) means 28 driven by breaker drive assembly 50, frame means 19 having rail cross braces 52, top cross braces 53, water overflow pipes 54 preferably connected into the drain recovery system, tail (pulley) shaft access panel 56, rear access door 58, rear feed material deflector 60 which is important for properly directing the feed stream from the coking towers onto the screening deck, side access doors 62, 66, front material deflector 64, discharge transfer shute 68, chain guard and chain hold down ledges 80, dewatering screens 26, channel frame 88, and conveyor drive assembly 84.

In a further embodiment the conveyor includes screening sections of different screen opening dimensions to thereby size the final product as desired.

Figure 13:
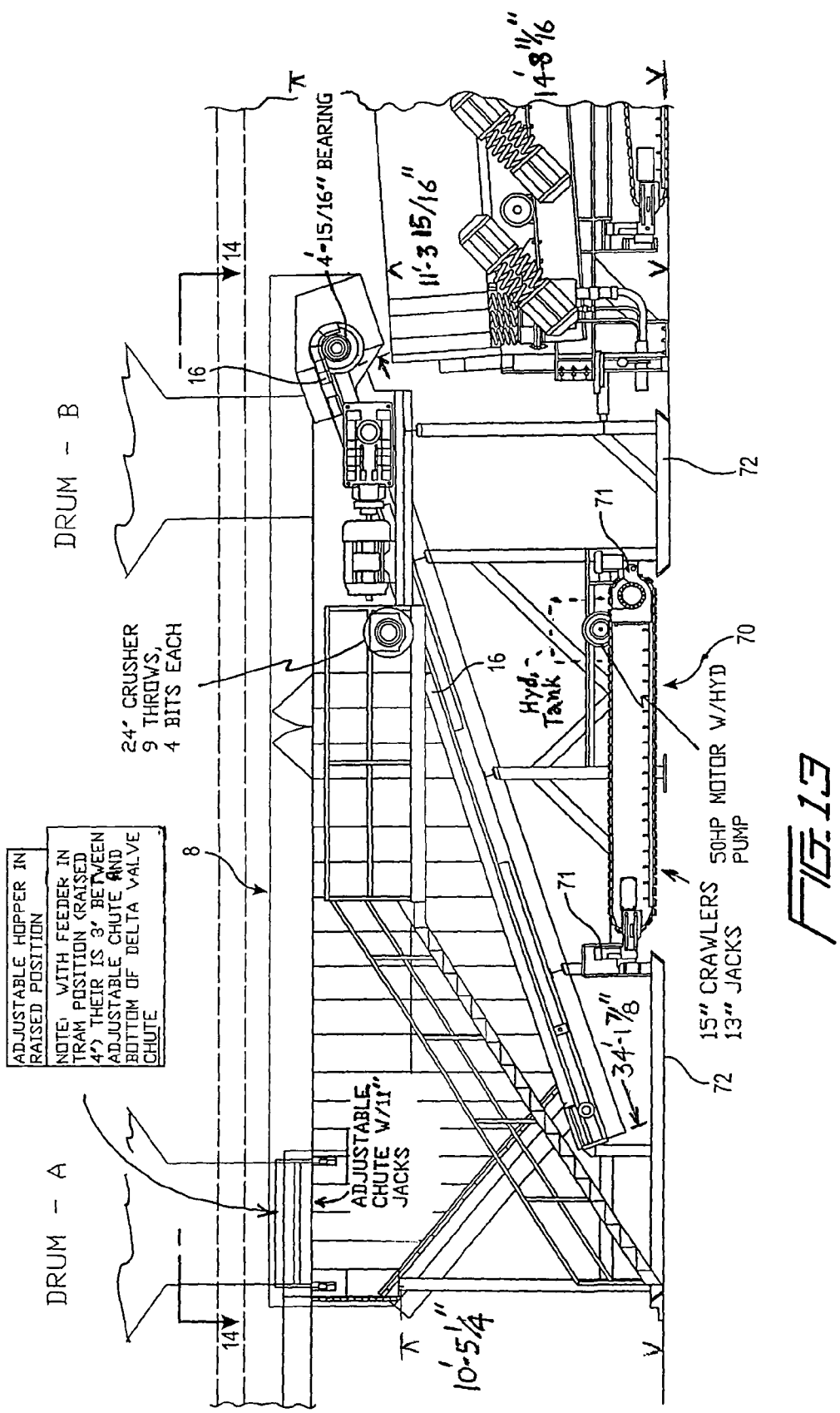
FIG. 13 is a side view, partially sectioned and with the facing side wall removed, of the present conveyor dewatering and crusher unit mounted on skids and having a mine type crawler for transport of the unit to positions under coking drums (towers) and giving typical dimensions.
Figure 14:
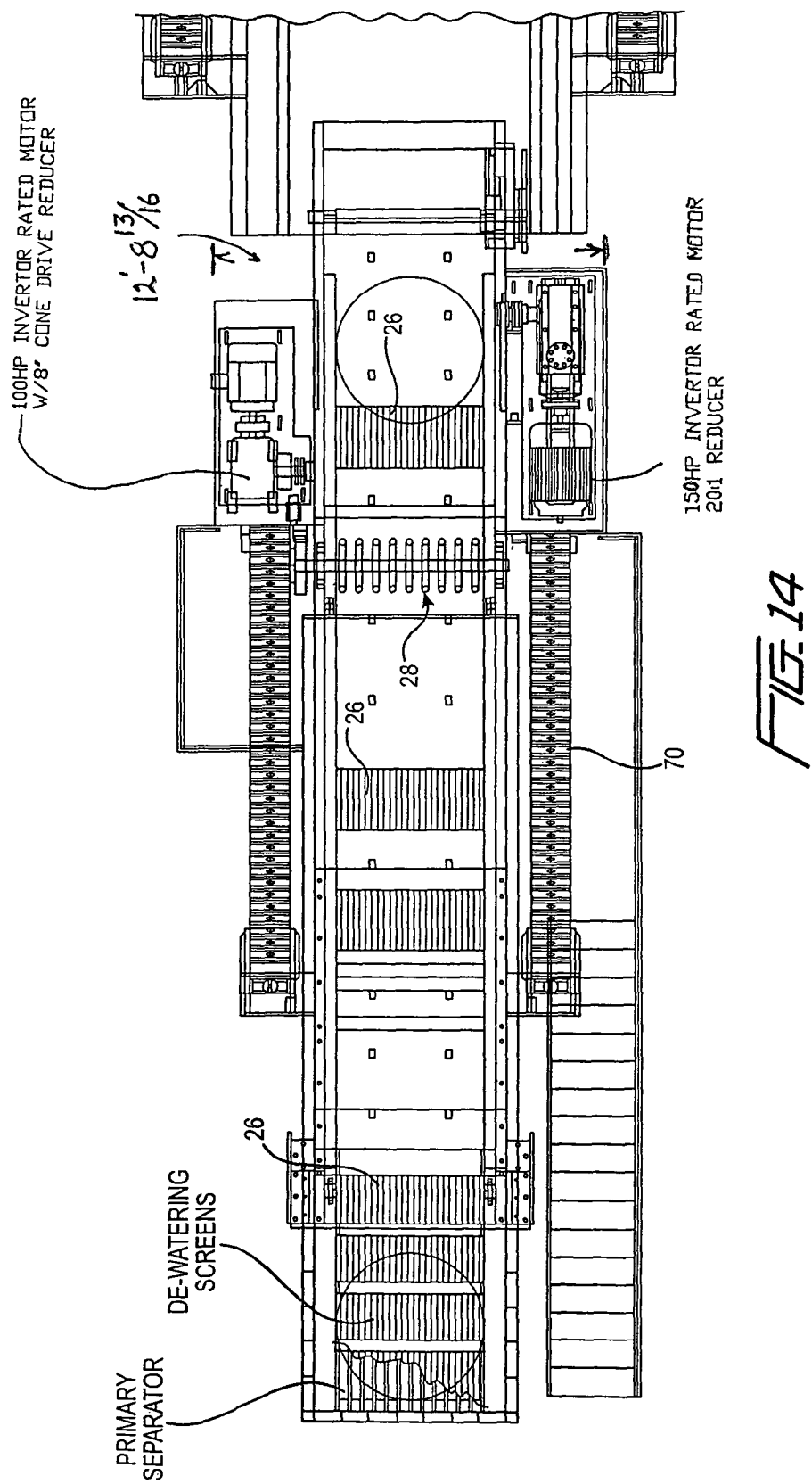
FIG. 14 is a top down view taken along line 14-14 in FIG. 13 with typical dimensions noted.

As shown in FIGS. 13, 14 and 15, a mine type crawler is affixed to the frame 19 of the conveyor structure 8 by hydraulic jacks 71 such that the conveyor structure including skids 72 can be lifted of the ground, e.g., up to a foot or more to allow the crawler to position the receiving end of the conveyor structure underneath a selected coking tower such as Drum A or Drum B.

A preferred method embodiment of the present invention comprises the steps of feeding a stream of chunks of crushable material and water to a stationary screening deck of a continuous conveyor having top and bottom flights carrying lateral drag bars, wherein the deck is laterally oriented between the flights, operating the conveyor to slide the bars and material along the screening deck and over dewatering screens mounted in the screening deck to gravity separate the water from the material and to drain the water onto a sluice deck located underneath the bottom flight and supporting the drag bars thereon, continuing conveying the dewatered material on the top flight forwardly to further downstream processing equipment such as a materials crusher while dragging the water (and fines) on the sluice deck rearwardly to a discharge location at a tail end portion of said sluice deck.

The invention has been described in detail with particular reference to preferred embodiments thereof, but it will be understood that variations and modifications will be effected with the spirit and scope of the invention.

I claim:

1. A material dewatering and conveying apparatus for separating solids from liquids comprising:
   a materials receiving end for receiving a solid/liquid mixture to be dewatered;
   a materials discharge end for discharging dewatered solids;
   an elongated longitudinal section of generally uniform lateral dimension situated between said receiving and discharging ends;
   laterally spaced continuous chains within said longitudinal section and mounted around drive sprocket means and idle sprocket means mounted on frame means, said chains providing top and bottom chain flights;
   drive motor means for rotating said drive sprocket means for cycling said chains in tandem;
   a plurality of longitudinally spaced material drag bars which span and are connected at their ends to said chains;
   a stationary screening deck having a substantially upper laterally planar solid surface having rectangular openings therein and being mounted on said frame means and extending under said top chain flight, dewatering drain screens mounted within said openings beneath the plane of said substantially upper laterally planar solid surface, said rectangular openings placing a region above said screening deck in fluid communication with said screens; and stationary sluice deck means mounted on said frame means underneath and supporting said bottom flight of said drag bars for receiving and containing water and material fines wherein said water and fines passing through said screens are dragged in a direction opposite to said top chain flight and on to a water/fines discharge outlet at a portion of said receiving end of said structure, while dewatered solids advance above said screening deck towards and through said materials discharge end.

2. The apparatus of claim 1 wherein the bottom chain flight bars are in contact with and are adapted to slide along a top surface of said sluice deck means.

3. The apparatus of claim 2 wherein said drag bars are in sliding contact with said planar surface of said screening deck.

4. The apparatus of claim 1 wherein the longitudinal side edges of said screening deck and of said sluice deck means are connected by containment side wall means to provide a substantially side and bottom sealed longitudinally extending sluice chute cavity.

5. The apparatus of claim 1 further including crushing means for receiving at least partially dewatered material and crushing it to desired sizes.

6. The apparatus of claim 5 wherein drain screens are located on a section of said apparatus downstream of said crushing means.

7. The apparatus of claim 1 wherein said discharge end is elevated above said receiving end to provide a downwardly slanted sluice flow pattern toward said discharge outlet.

8. The apparatus of claim 7 wherein said screening deck is slanted upwardly to position the discharge end up to about 20 feet above said receiving end.

9. The apparatus of claim 1 further including containment side wall means and a containment rear wall means connected thereto and extending upwardly up to about 20 feet above ground level.

10. The apparatus of claim 1 wherein only the discharge end portion of the conveyor structure is elevated above said receiving end portion.

11. The apparatus of claim 1 further being mounted on a crawler.

\* \* \* \* \*